INVENTORS
JACOB L. VARSANO
LEON LACHMAN
JOSEPH P. PELOGHITIS

United States Patent Office 3,511,900
Patented May 12, 1970

3,511,900
GRANULATING PROCESS
Jacob Leon Varsano, Morristown, Leon Lachman, Millburn, and Joseph Peter Peloghitis, Liberty Corner, N.J., assignors to Ciba Corporation, New York, N.Y., a corporation of Delaware
Continuation-in-part of application Ser. No. 582,054, Sept. 26, 1966. This application Aug. 22, 1967, Ser. No. 662,524
Int. Cl. B01j 2/12
U.S. Cl. 264—101                         9 Claims

ABSTRACT OF THE DISCLOSURE

An improved granulating process is provided in which the powdered material to be granulated is sprayed with about 5–50% of its weight of a granulating fluid in a plurality of separate sprays while simultaneously being rotated and vacuum-dried. The rate of addition of the granulating fluid and the rate of removal of the fluid by vacuum drying is programmed so as to induce local granulation, but is insufficient to cause agglomeration of the powdered materials.

Cross-references to related applications

This application is a continuation-in-part of application Ser. No. 582,054, filed Sept. 26, 1966 and now abandoned.

Background of the invention

This invention is related to a novel process for granulating powdered material. More particularly this invention is concerned with a process for producing granules of powdered pharmaceutical material especially suited for tableting.

Pharmaceutical tablets are prepared from powdered materials by granulating the powdered materials and then compressing the granules into tablets. Optimum results are obtained when the granules are of a relatively uniform size, which granules flow into and uniformly fill the tableting dies. The granulating process is, therefore, one of the more important steps in tablet manufacture.

The granulating process widely used in the pharmaceutical industry tend to produce non-uniform sized granules which exhibit uneven flow properties. These processes are also relatively inefficient, consisting of numerous time-consuming steps.

The most commonly used process is referred to as the "wet process." The powdered material to be granulated is moistened with water, a solvent or a binder solution and kneaded into a pasty mixture. The mixture is then forced through a screen to divide the pasty mixture into granules. The resultant product after drying is relatively coarse and contains large lumps which must be crushed and ground.

The wet process has many inherent disadvantages, including high cost because of the considerable time and labor involved. The granules produced by the wet process are irregularly shaped and non-uniform in weight.

An improved granulating process was suggested in U.S. Pat. 2,877,159, granted to Lachman et al. In this process a volatile fluid is introduced as vapor into a closed mixer. The vapor condenses and the resultant condensed liquid induces granulation. This process is a substantial improvement over the above-mentioned "wet process" but does not overcome all of the problems. Slight temperature variations cause substantial changes in the condensation rates and can adversely affect the granulating process. Furthermore, the vapors tended to condense and collect on the wall of the mixer causing caking of the powdered materials. A further problem encountered with the Lachman et al. process is that certain of the additives commonly blended with the granulating liquid, for example, soluble binders, cannot be applied in the vapor form.

One of the objects of this invention is to overcome the above-mentioned problems and disadvantages of the prior art processes.

The primary object of this invention is to provide a process for producing free flowing, uniform-sized granules from powdered materials.

It is an additional object of this invention to provide an efficient process for granulating powdered materials.

Other objects and advantages of the present invention will further become apparent hereinafter and in the drawings.

Summary of the invention

Briefly the objects of this invention are achieved by providing a process in which the powdered material to be granulated is treated with a plurality of sprays of a granulating liquid, and the material rotated at a sufficient speed to cause the liquid and powdered material to form granules. Vacuum and heat are simultaneously applied to maintain an amount of liquid in contact with the powdered material which is sufficient to cause granulation but insufficient to cause large agglomeration of said powdered material.

Description of the preferred embodiments

Figure 1:
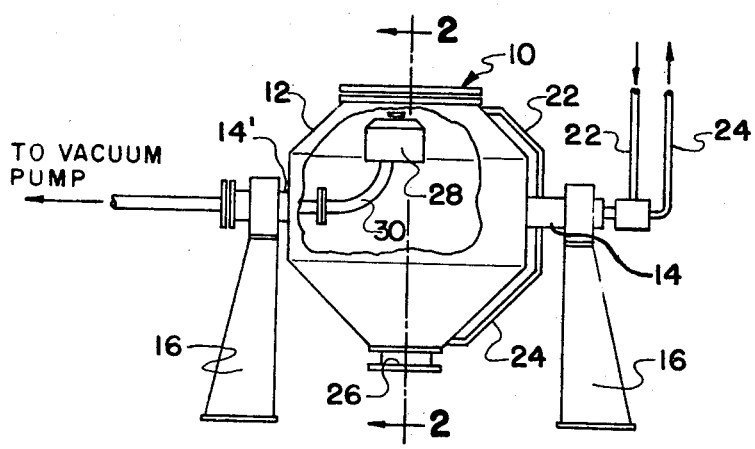
FIG. 1 is an illustration in partial cross section of a granulating apparatus suitable for employment in this invention.
Figure 2:
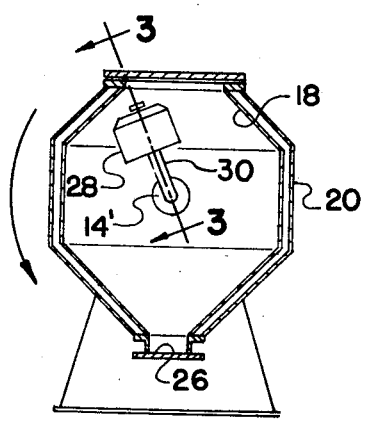
FIG. 2 is a cross sectional illustration of the apparatus of FIG. 1 taken along line 22 of FIG. 1.
Figure 3:
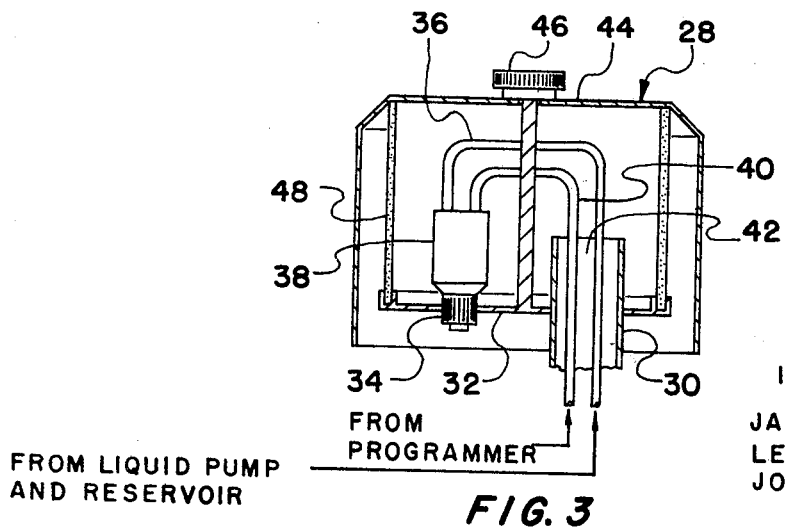
FIG. 3 is a cross sectional illustration of the combination dispensing nozzle and vacuum inlet of the apparatus illustrated in FIG. 1 taken along lines 3—3 of FIG. 2.

In order to facilitate the explanation of the process of the present invention, specific reference will be made to the apparatus described above. However, it is to be understood that while the apparatus described above is well suited for employment in the process of this invention, the process of this invention is not limited to any particular type of apparatus and may be utilized apart from the apparatus herein described.

Turning now to the drawings, the number 10 generally denotes a granulator suitable for employment in this invention. The granulator 10 is comprised of a double coned jacketed mixer 12 which is adapted to be rotated either by hand or with a motor on the axles 14, 14', which are supported on mounts 16. The mixer 12 has connected inner and outer shell portions 18, 20 which form a heat exchange jacket about the interior of the mixer 12. The mixer 12 may be heated or cooled by circulating a heat exchange fluid, for example, cooled brine or steam, through the inlet pipe 22, which is in communication with the heat exchanger jacket of the mixer 12, through the jacket, and out the exit pipe 24. The mixer 12 has a loading port 26 which is in communication with the interior of the mixer 12 and has a detachable cover.

Positioned within the interior of the mixer 12 is a combination dispensing nozzle and vacuum drying head 28. A vacuum pipe 30 is in communication with the head 28 at a first terminal end, and passes from the interior of the mixer 12 through one of the axles 14' to a vacuum pump (not shown). The head 28 and vacuum pipe 30 are stationary within the mixer 12, which is adapted to rotate about the head 28 and vacuum pipe 30. The head 28 and the vacuum pipe 30 are shown aligned at approximately a 15° angle. The angles of alignment of the head 28, however, may advantageously be varied to an angle between 10° and 50°, depending on the process variable such as the type of material to be granulated, the type of granulating fluid employed and the relative amount of material to be processed. In the apparatus illustrated, the direction of rotation is indicated to be counterclockwise.

The dispensing and vacuum drying head 28 is comprised of a mounting plate 32 to which a nozzle 34 and the vacuum pipe 30 are attached. Granulating fluids are supplied to the nozzle 34 through a tube 36 which has its first terminal end in communication with the nozzle 34 and passes through the vacuum pipe 30 and out of the mixer 12 to a fluid pump and an external fluid reservoir (not shown). The flow through the tube 36 is controlled by a valve 38 which is positioned immediately before the nozzle 34. The valve 38 is activated by remote control by a signal from a programmer (not shown) which controls the amount of fluid emitted in each spray. The signal from the programmer is transmitted through a control line 40 which is attached to the programmer and passes through the vacuum pipe 30. The vacuum pipe 30 terminates within the head 28. The end of the vacuum pipe 30 is open, forming a vacuum inlet 42. A detachable cover 44 protects the above-mentioned parts of the vacuum head 28. The cover 44 is secured to the mounting plate 32 with a nut 46. A cylindrical sintered stainless steel filter 48 is attached to the mounting plate 32. The filter surrounds the nozzle 34 and the vacuum aperture 42 and prevents the material being processed from being drawn into the interior of the head 28.

If the granules are to consist of a blend of several different materials, such as the typical pharmaceutical preparations, the initial step is to blend the various materials together. Preweighed quantities of the powdered materials are loaded into the mixer 12 through the loading port 26, and the mixer is rotated on its axles 14, 14′ until the materials are uniformly blended.

During the blending step, or if a single material is used immediately after loading, the powdered material is preferably raised to a predetermined temperature and maintained at this temperature for the remainder of the granulating process. The temperature is preferably as high as possible in oder to facilitate the removal of the granulating liquid from the granules. There is, however, an upper limit on the temperature. The temperature should be sufficiently low so as not to cause degradation of the material being processed and must also be below the vaporization temperature of the granulating liquid. While the process of the present invention is preferably conducted at higher temperatures, it should also be noted that the present process can satisfactorily be conducted at room temperatures if the vacuum drying cycles are lengthened to facilitate the removal of the granulating fluid.

When the various components are adequately blended and the desired temperature is obtained, the air remaining in the mixer 12 is evacuated through the vacuum inlet 42 by applying a vacuum. It is preferable to use as high a vacuum as can be economically obtained to evacuate the air from the mixer and for the subsequent vacuum drying steps. It has been found that a vacuum in the order of 29 inches of mercury produces satisfactory results. Higher vacuums can advantageously be employed. Lower vacuums may also be used, but the relative time required for the vacuum drying steps is proportionately increased.

In the present process, the amount of granulating liquid required to granulate a given amount of powered material is added in a plurality of intermittent sprays in amounts sufficient to induce local granulation but insufficient to cause aggregation of the powdered material into large lumps or aggregates. The granulating liquid before it is added is divided into discrete size droplets, for example by atomizing the liquid. The liquid droplets are sprayed into the powdered materials and the particles and powdered material are rotated together. As the sprayed liquid and the powedered materials rotate, they are blended together and form granules. The powdered material initially contacted by the liquid droplets is wetted by and may parti- ally dissolve in the liquid. Small nuclei with sticky surfaces are formed, which on further rotation collect additional powdered material to form the desired size granule. A vacuum is continuously applied to the material being processed which is sufficient to remove the granulating liquid from the granules as they are formed. The granules, being considerably heavier than the ungranulated powders, tend to be drawn by centrifugal force to the outer surfaces of the granulator 10, and additional amounts of powdered material are presented to subsequent sprays and the above procedure is repeated.

The total quantity of liquid required is dependent on the solvent power of the particular material utilized as the granulating liquid and the physical properties, in particular the solubility and surface area of the powdered material being granulated. Various types of powdered material require different amounts of granulating liquid to induce granulation. The amount of granulating fluid required to cause granulation can vary between a low of 5% and a high of 50% by weight of the powdered material to be granulated. The amount of granulating fluid employed is preferably between 5–30% by weight of the material to be granulated. The 5–30% range is especially useful for preparing granules of pharmaceutical preparations. Excess amounts of granulating fluid may be employed, but this is of no advantage since substantially all of the fluid, including the excess fluid, must be removed before tableting.

It should be carefully noted that only a quantity of a granulating liquid sufficient to induce local granulation is added at a given time and that as the granules form the granulating liquid is simultaneously removed by vacuum drying. If all of the granulating liquid required for granulation were added at one time, or if the liquid was not removed as the granules formed, the above-mentioned problems of the prior art would be encountered.

A wide variety of materials may be used in the present process as the granulating liquid. The liquids commonly used in granulating processes, for example water, hydroalcoholic mixtures such as ethanol and water, acetone, chloroform, ether and similar liquids may also be utilized in this process. In addition, various additives such as binders, dyes, etc., may also be added with the granulating liquid.

The size of the individual droplets and the quantity of liquid in each spray are important factors for controlling the size of the final granules since the droplets form the nuclei for the granule formation.

It has been found that with granulating fluids having a fluidity approximately that of water that satisfactory size droplets can be obtained if the liquid is fed at an approximately 100–600 p.s.i. through a nozzle 34 having an orifice size between 0.011 inch and 0.20 inch.

The spray pattern is preferably relatively flat and of a fan-shaped configuration. The nozzle 34 should be positioned so that the spray is directed radially towards the rotating material in the mixer 12. The spray pattern should also be directed so that the granulating liquid does not collect on the surfaces of the mixer 12 and cause objectionable caking of the powdered material on the interior surfaces. The valve 38 cuts the flow of granulating fluid off immediately before the nozzle 34, preventing the liquid from running into the mixer 12 between sprays.

The size of the granules is also influenced by the amounts of the liquid dispensed in each spray cycle. The greater the amount of fluid dispensed in a single spray cycle, in general the larger the size of the granules. This appears to be due partly to a tendency for a plurality of sprayed liquid particles to combine into a larger droplet which then becomes the nucleus for granulation.

It has been found that it is both economically and technically preferable to add the granulating liquid in a plurality of separate sprays. It is considerably easier to vacuum remove liquid added in smaller amounts, and the product produced by adding smaller amounts of liquid in each spray tends to be more uniform in granule size. It is preferable to divide the amount of liquid required to granulate the entire batch of powdered material into at least 35 to 55 separate additions.

The length of time between each spray addition of liquid is dependent on the rates of removal of the granulating liquid by the vacuum drying means. As noted above, the ratio of granulating liquid to powdered material and granules should be sufficient to cause local granulation but insufficient to cause aggregation of the powdered material into large lumps. Accordingly, it is important to monitor the moisture content of the material as it is being processed. Additional granulating liquid should only be added when the material is sufficiently low in moisture content that the addition will not cause agglomeration. The preferable rate of addition of granulating liquid is dependent on the many separate factors such as temperature, vacuum drying condition, type of materials being processed and type of granulating liquid utilized. However, one skilled in the art by observing the material as it is being processed and utilizing the teachings of this invention can readily determine the proper conditions to obtain the desired degree of granulation.

When the granulation process is completed, rotation should be continued until the granules have been dried to the desired moisture content. Thereafter the granules are rotated while being simultaneously cooled down to room temperature. At this point various additives such as lubricants may be applied.

One of the most important advantages of the present invention is that the granules are generally spherical and of a relatively uniform weight and size. Accordingly, the granules can be accurately metered by automatic equipment and flow readily in tableting apparatus. In addition, the granulating process of the present invention is considerably faster and costs less than the prior art processes.

The following examples illustrate the process of this invention.

EXAMPLE 1

The following materials were blended in a sealed double cone rotary mixer for 30 minutes while being heated at a temperature of 50° C.

| | Kg. |
|---|---|
| α-Ethyl-α-phenyl glutarimide | 100.000 |
| Magnesium aluminum silicate | 4.000 |
| Methyl cellulose | 2.666 |
| Wheat starch | 22.123 |
| Colloidal silica | 1.333 |
| Stearic acid | 2.646 |
| Lactose | 0.026 |

A vacuum of 29 inches of mercury was applied and maintained for the remainder of the process.

A 50% aqueous solution of ethanol in an amount equivalent to 10% of the weight of the material being processed was added to the batch in 40 separate spray emissions. The granulating liquid was sprayed through a nozzle having a .072 inch orifice at 500 p.s.i. pressure. The spray cycles were programmed to last 5 seconds each with a 15 second lapse between each cycle.

After all the granulating liquid was added and granulation was completed, the batch was cooled to room temperature and a surface lubricant was applied to the granules.

EXAMPLE 2

The following materials were blended in a sealed double cone rotary mixer for 30 minutes while being heated to a temperature of 50° C.

| | Kg. |
|---|---|
| Tripelennamine | 25.0000 |
| Acacia Powder | 5.0000 |
| Lactose | 58.9808 |
| Talc | 5.0000 |
| Magnesium stearate | 1.0000 |

A vacuum of 29 inches of mercury was applied and maintained for the remainder of the process.

A 10 liter aqueous solution containing 5 kg. of polyethylene glycol 6000 and 0.002 kg. of FD & C Blue No. 1 was added to the above-mentioned materials in 50 separate spray cycles. The granulating fluid was sprayed through a nozzle having a 0.062 diameter at 500 p.s.i. The spray cycles were programmed to last 5 seconds with a 20 second drying lapse between each cycle. After all the granulating liquid was added and granulation was completed, the granules were cooled to room temperature and removed from the double cone rotary mixer.

We claim:

1. The process for granulating powdered materials suitable for pharmaceutical tableting comprising:
    intermittently treating a given amount of the powdered material with a plurality of finely divided sprays of a granulating liquid, each of said sprays containing a quantity of liquid sufficient to cause local granulation but insufficient to cause agglomeration of said powdered material, the total quantity of granulating liquid added in all of said sprays being sufficient to granulate the given amount of powdered material;
    while rotating the powdered material and sprayed liquid particles at a linear speed sufficient to cause the liquid and powdered material to combine and form granules; and
    simultaneously vacuum drying said granules as they form, maintaining an adequate amount of granulating liquid in contact with the powdered material and granules to cause granulation but insufficient to cause agglomeration.

2. The process according to claim 1 wherein an amount of granulating liquid is removed by vacuum drying between each of said intermittent sprays which is approximately equal to the quantity of granulating liquid introduced in the previous spray.

3. The process according to claim 1 wherein the total quantity of granulating liquid is 5–50% by weight of said given amount of powdered material.

4. The process according to claim 3 wherein the granulating liquid is added in at least 30–55 sprays.

5. The process according to claim 1 wherein the total quantity of granulating liquid is 5–30% by weight of said given amount of powdered material.

6. The process according to claim 5 wherein the granulating liquid is added in at least 30–55 sprays.

7. The process according to claim 1 wherein the granulating liquid is atomized by forcing said liquid through an about 0.011–0.20 in. orifice while applying approximately 100–600 p.s.i.

8. The process according to claim 1 including the step of heating and maintaining the temperature of said powdered material slightly below the degradation temperature of said powdered material and below the vaporization temperature of said granulating liquid.

9. The process according to claim 1 wherein said granulating liquid includes binders.

References Cited

UNITED STATES PATENTS

| 3,265,679 | 8/1966 | Black et al. | 264—117 |
| 3,308,217 | 3/1967 | Lowy et al. | 264—117 |
| 3,400,185 | 9/1968 | Kohnle et al. | 264—117 |

ROBERT F. WHITE, Primary Examiner

J. R. HALL, Assistant Examiner

U.S. Cl. X.R.

264—117